(12) United States Patent
Takaya

(10) Patent No.: US 11,275,216 B2
(45) Date of Patent: Mar. 15, 2022

(54) OPTICAL FIBER COUPLER

(71) Applicant: TATSUTA ELECTRIC WIRE & CABLE CO., LTD., Osaka (JP)

(72) Inventor: Masato Takaya, Kyoto (JP)

(73) Assignee: TATSUTA ELECTRIC WIRE & CABLE CO., LTD., Osaka (JP)

(\*) Notice: Subject to any disclaimer, the term of this patent is extended or adjusted under 35 U.S.C. 154(b) by 0 days.

(21) Appl. No.: 16/619,186

(22) PCT Filed: May 28, 2018

(86) PCT No.: PCT/JP2018/020303
§ 371 (c)(1),
(2) Date: Dec. 4, 2019

(87) PCT Pub. No.: WO2018/225554
PCT Pub. Date: Dec. 13, 2018

(65) Prior Publication Data
US 2020/0150349 A1   May 14, 2020

(30) Foreign Application Priority Data
Jun. 6, 2017   (JP) .............................. JP2017-111880

(51) Int. Cl.
*G02B 6/024*   (2006.01)
*G02B 6/255*   (2006.01)
(Continued)

(52) U.S. Cl.
CPC ........... *G02B 6/3636* (2013.01); *G02B 6/024* (2013.01); *G02B 6/2835* (2013.01);
(Continued)

(58) Field of Classification Search
CPC .... G02B 6/3636; G02B 6/024; G02B 6/3889; G02B 6/2552; G02B 6/26; G02B 6/287;
(Continued)

(56) References Cited

U.S. PATENT DOCUMENTS 4,652,079 A    3/1987   Shaw et al.
5,404,415 A *  4/1995   Mori .................... G02B 6/2835
                                                                385/43
(Continued)

FOREIGN PATENT DOCUMENTS

CN    103234672 A    8/2013
CN    203799053 U    8/2014
(Continued)

OTHER PUBLICATIONS

International Search Report (ISR) dated Jul. 17, 2018 filed in PCT/JP2018/020303.
(Continued)

*Primary Examiner* — Ryan A Lepisto
(74) *Attorney, Agent, or Firm* — Rankin, Hill & Clark LLP

(57) ABSTRACT

Provided is an optical fiber coupler capable of suppressing variation of polarization state of light passing through a coupler portion. The optical fiber coupler includes: a substrate having a groove; a coupler portion which is inserted into the groove and to which a middle portion of each of optical fibers is joined; and an adhesive for bonding the coupler portion to the substrate. Shore D hardness of the adhesive is 10 to 35. By setting the Shore D hardness of the adhesive to 10 to 35, it is possible to suppress the variation of the polarization state of the light passing through the coupler portion.

9 Claims, 7 Drawing Sheets

(51) Int. Cl.
  *G02B 6/28* (2006.01)
  *G02B 6/36* (2006.01)
  *G02B 6/38* (2006.01)
(52) U.S. Cl.
  CPC .............. *G02B 6/2843* (2013.01); *G02B 6/36* (2013.01); *G02B 6/3889* (2013.01); *G02B 6/2552* (2013.01); *G02B 6/2856* (2013.01)
(58) Field of Classification Search
  CPC .. G02B 6/2835; G02B 6/2843; G02B 6/2856; G02B 6/36
  See application file for complete search history.

(56) References Cited

U.S. PATENT DOCUMENTS

| | | | | |
|---|---|---|---|---|
| 5,430,821 | A | * | 7/1995 | Sasoka ................. G02B 6/2835 385/99 |
| 5,682,453 | A | | 10/1997 | Daniel et al. |
| 5,848,208 | A | | 12/1998 | Suzuki et al. |
| 6,788,865 | B2 | | 9/2004 | Kawanishi et al. |
| 2001/0026667 | A1 | | 10/2001 | Kawanishi et al. |
| 2013/0308914 | A1 | | 11/2013 | Hayashi et al. |
| 2015/0322310 | A1 | * | 11/2015 | Taleyarkhan ........ C08K 5/1535 428/431 |
| 2017/0139129 | A1 | | 5/2017 | Luo et al. |

FOREIGN PATENT DOCUMENTS

| | | | | |
|---|---|---|---|---|
| JP | 57-158806 | A | | 9/1982 |
| JP | 60-084033 | A | | 5/1985 |
| JP | 5-150140 | A | | 6/1993 |
| JP | 6-25810 | U | | 4/1994 |
| JP | H0625810 | U | * | 4/1994 ............... G02B 6/28 |
| JP | 06-222238 | A | | 8/1994 |
| JP | 8-146245 | A | | 6/1996 |
| JP | 10-90548 | A | | 4/1998 |
| JP | 2001-318260 | A | | 11/2001 |
| JP | 2002-055253 | A | | 2/2002 |
| JP | 2003-167155 | A | | 6/2003 |
| JP | 2003-215392 | A | | 7/2003 |
| JP | 2003-337251 | A | | 11/2003 |
| JP | 2005-181899 | A | | 7/2005 |
| JP | 2005-338410 | A | | 12/2005 |
| WO | 2012/046696 | A1 | | 4/2012 |

OTHER PUBLICATIONS

Office Action dated Nov. 13, 2018 for the corresponding Japanese Patent Application No. 2017-111880 and its English machine translation.

Office Action dated Feb. 26, 2019 for the corresponding Japanese Patent Application No. 2017-111880 and its English machine translation.

Decision of Refusal dated Jul. 2, 2019 for the corresponding Japanese Patent Application No. 2017-111880 and its English machine translation.

Decision of Dismissal of Amendment dated Jul. 2, 2019 for the corresponding Japanese Patent Application No. 2017-111880 and its English machine translation.

Chinese Office Action (CNOA) dated Dec. 10, 2020 issued in the corresponding Chinese Patent Application No. 201880037376.6 and its Partial English Translation.

Extended European Search Report (EESR) dated Jan. 14, 2021 issued in the corresponding European Patent Application No. 18813639.4.

Japanese Office Action (JPOA) dated Jun. 8, 2021 for the corresponding Japanese Patent Application No. 2019-182389 and its English machine translation.

* cited by examiner

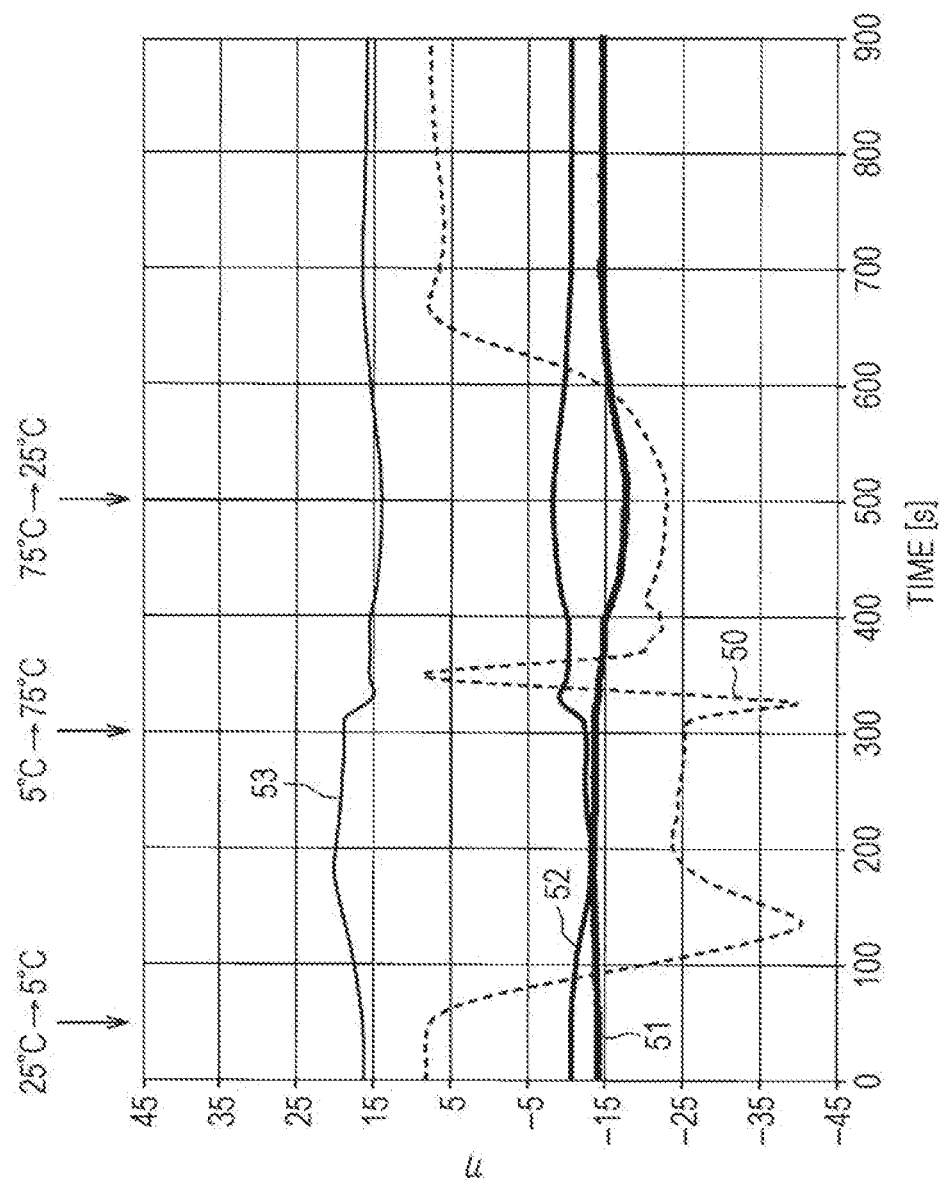

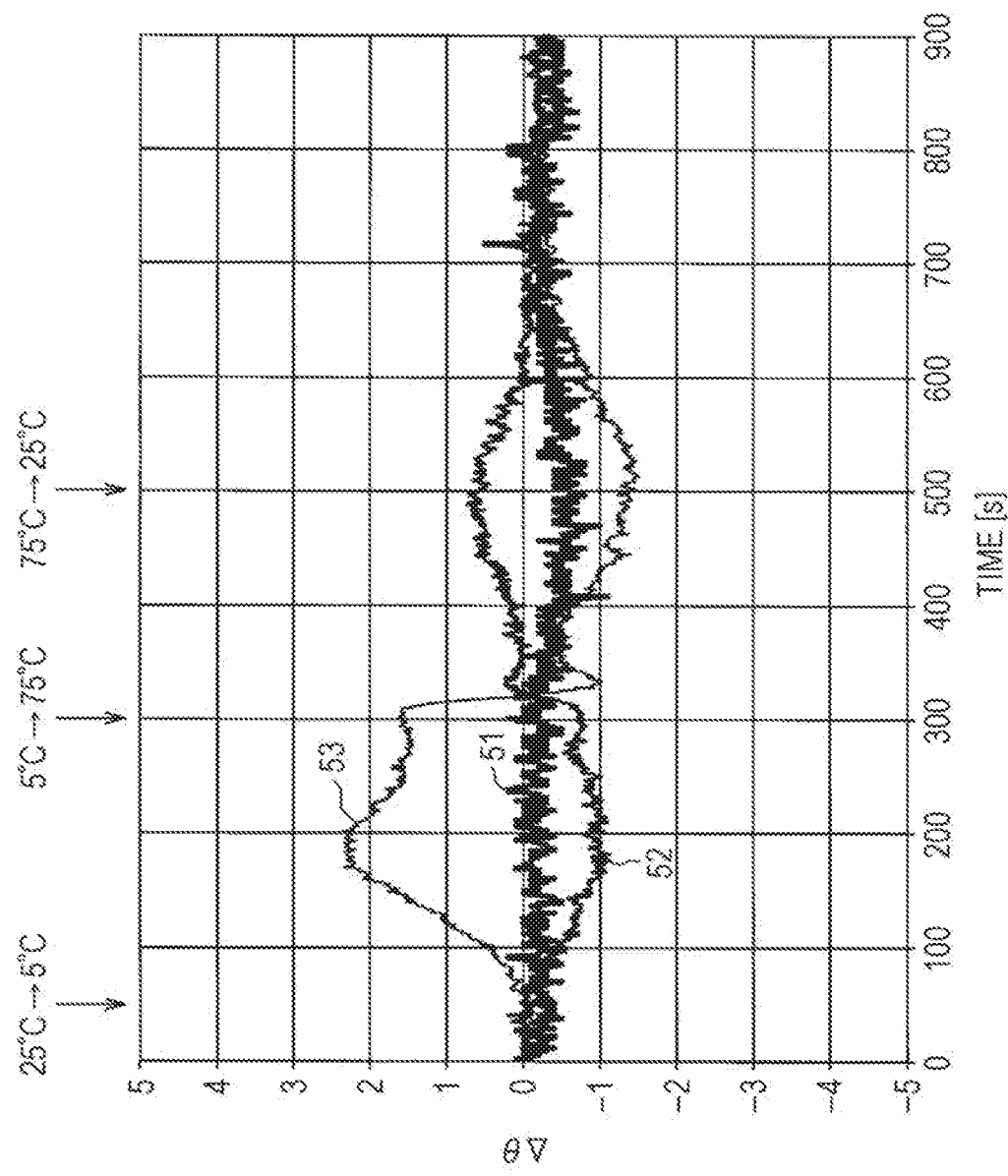

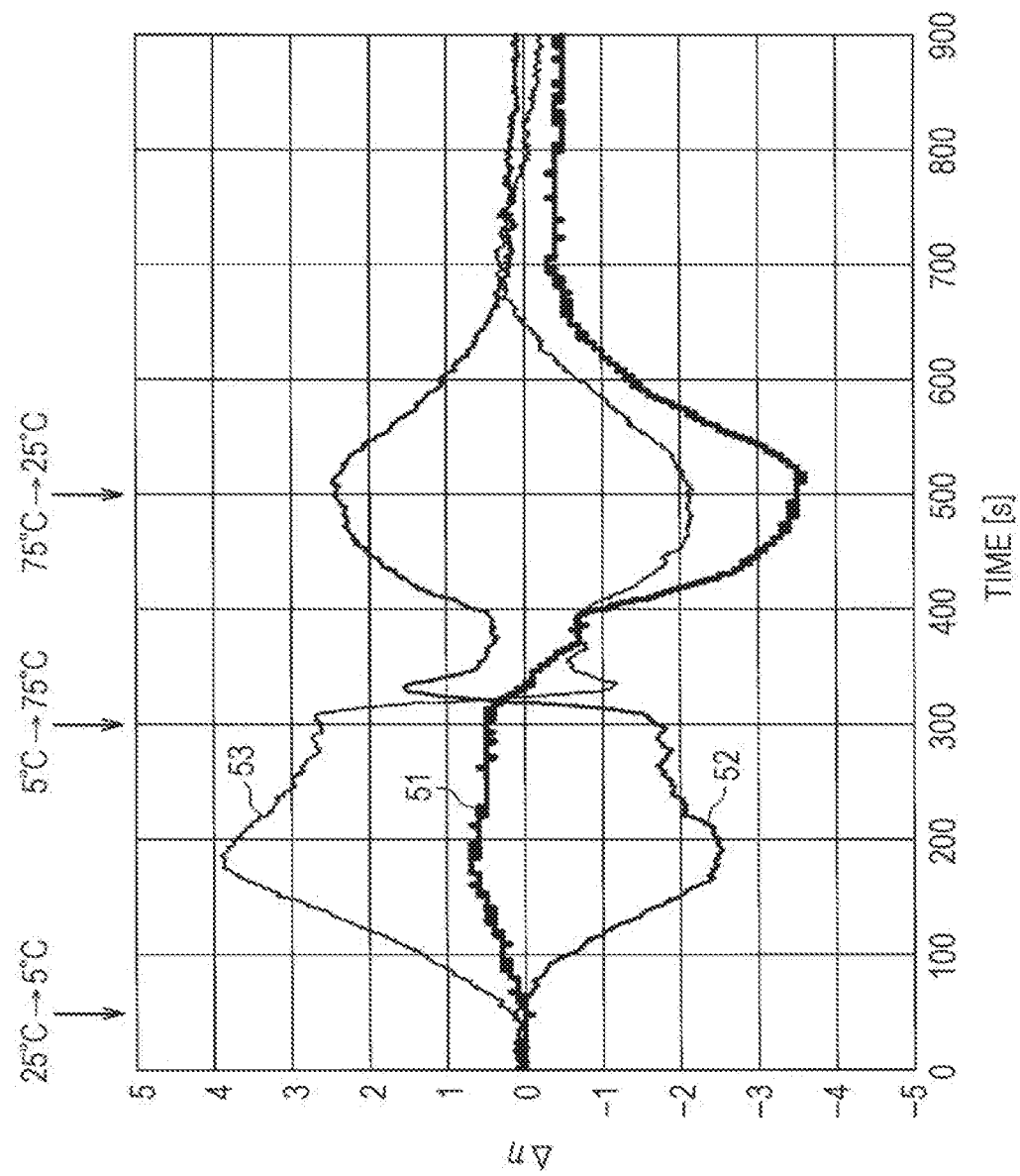

OPTICAL FIBER COUPLER

TECHNICAL FIELD

The present invention relates to an optical fiber coupler for separating and combining light between a plurality of optical fibers.

BACKGROUND ART

In general, when an optical fiber coupler is manufactured, a middle portion of each of the plurality of optical fibers is heated to melt a cladding of the optical fiber so that the middle portion may be stretched and joined to form a coupler portion. The coupler portion is, for example, inserted into a groove of a substrate, and is fixed inside the groove with an adhesive (see, for example, PATENT LITERATURE 1).

According to PATENT LITERATURE 1, when the adhesive having a tensile shear adhesive strength of 5 MPa or more is used, it is possible to suppress variation of insertion loss of light passing through the optical fiber coupler.

CITATION LIST

Patent Literature

PATENT LITERATURE 1: JP-A-2005-181899

SUMMARY OF THE INVENTION

Problems to be Solved by the Invention

However, the optical fiber coupler does not consider factors other than the variation of optical insertion loss.

The optical fiber coupler according to the present invention has been invented in view of such circumstances. An object of the present invention is to suppress the variation of polarization state of the light passing through the coupler portion.

Solution to the Problems

An optical fiber coupler according to the present invention includes: a substrate having a groove; a coupler portion which is inserted into the groove and to which a middle portion of each of optical fibers is joined; and an adhesive for bonding the coupler portion to the substrate. Shore D hardness of the adhesive is 10 to 35.

In the optical fiber coupler according to the present invention, a viscosity of the adhesive is 5000 to 15000 mPa·s.

In the optical fiber coupler according to the present invention, when an azimuth angle of the light that has passed through the coupler portion is measured over time, an absolute value of variation range of the azimuth angle with respect to temperature change of 5 to 75° C. is 10 degrees or less.

Effects of the Invention

In the optical fiber coupler according to the present invention, it is possible to suppress the variation of the polarization state of the light passing through the coupler portion by setting Shore D hardness of the adhesive to 10 to 35.

BRIEF DESCRIPTION OF THE DRAWINGS

FIG. 7 is a graph showing an ellipticity angle η measured over time by the polarimeter.

FIG. 8 is a graph showing a variation value Δθ of the azimuth angle θ with reference to a value at start of measurement.

FIG. 9 is a graph showing a variation value Δη of the ellipticity angle η with reference to a value at the start of measurement.

DESCRIPTION OF THE EMBODIMENTS

Figure 1:
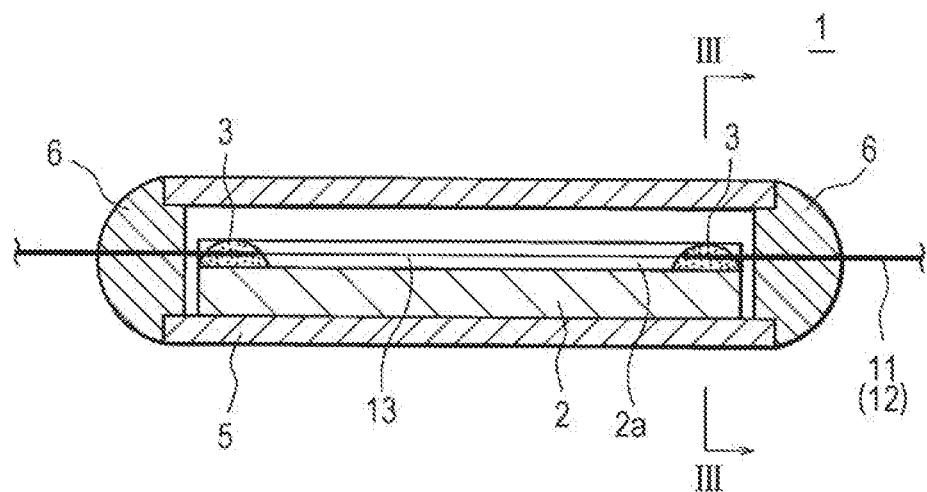
FIG. 1 is a cross-sectional view schematically showing an optical fiber coupler.
Figure 2:
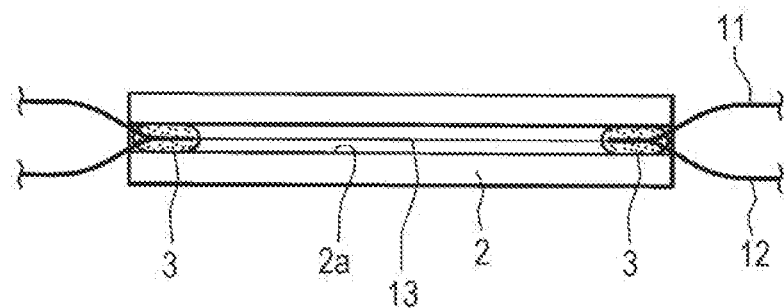
FIG. 2 is a plan view schematically showing a substrate and a coupler portion.
Figure 3:
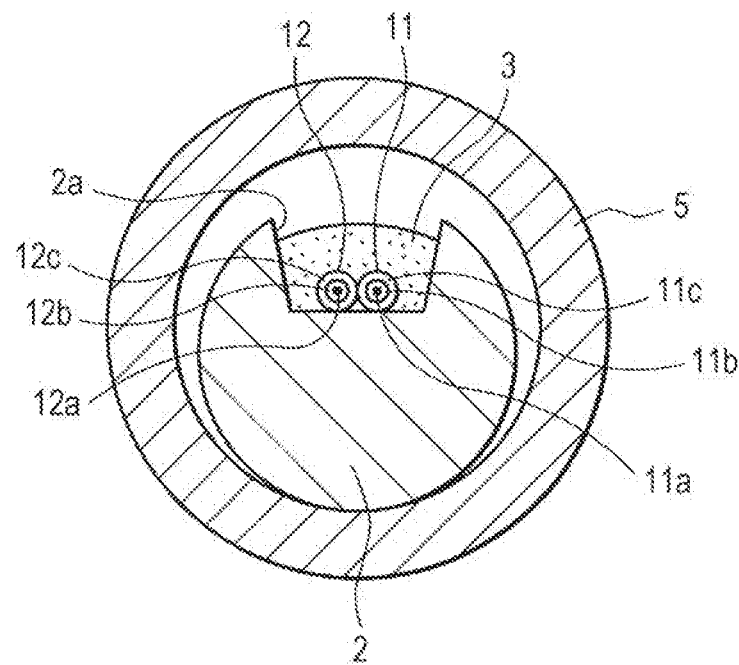
FIG. 3 is a schematic cross-sectional view taken along line III-III shown in FIG. 1.

Hereinafter, an optical fiber coupler 1 according to an embodiment will be described with reference to the drawings. FIG. 1 is a cross-sectional view schematically showing the optical fiber coupler 1. FIG. 2 is a plan view schematically showing a substrate 2 and a coupler portion 13. FIG. 3 is a schematic cross-sectional view taken along line III-III shown in FIG. 1.

The optical fiber coupler 1 includes a columnar substrate 2. As a material of the substrate 2, quartz, Invar, Kovar, or the like can be used. In this example, quartz is used. The substrate 2 is formed with a groove 2a in its longitudinal direction. The coupler portion 13 is inserted into the groove 2a. The coupler portion 13 includes a first optical fiber 11 and a second optical fiber 12. The first optical fiber 11 includes a core 11a, a cladding 11b that covers a periphery of the core 11a, and a covering portion 11c that covers a periphery of the cladding 11b. The second optical fiber 12 includes a core 12a, a cladding 12b that covers the periphery of the core 12a, and a covering portion 12c that covers the periphery of the cladding 12b. After removing the covering portions 11c and 12c of the first optical fiber 11 and the second optical fiber 12, the claddings 11b and 12b are washed with alcohol or the like. Thereafter, middle portions of the first optical fiber 11 and the second optical fiber 12 are heated to melt the claddings 11b and 12b of the first optical fiber 11 and the second optical fiber 12 so that the middle portions may be stretched and joined to form the coupler portion 13. Note that the coupler portion 13 may include three or more optical fibers.

In the coupler portion 13, a ratio (branching ratio) between an amount of light passing through the first optical fiber 11 and an amount of light passing through the second optical fiber 12 is a predetermined ratio. For example, when the branching ratio is set to 50:50, 50% of the amount of light introduced into the first optical fiber 11 moves to the second optical fiber 12 through the coupler portion 13.

Adhesives 3 are respectively provided at two locations of the groove 2a. The adhesive 3 includes, for example, a visible light curable resin material or an ultraviolet curable resin material, and includes an epoxy resin material or an acrylate resin material. The adhesives 3 are arranged at both end portions of the groove 2a.

Shore D hardness of the cured adhesive 3 is, for example, 10 to 35, and preferably 15 to 35. If the Shore D hardness is less than 10, when environmental temperature rises, the adhesive 3 is too soft and the coupler portion 13 is easily deformed. If the Shore D hardness exceeds 35, stress tends to concentrate on a part of the coupler portion 13 and the coupler portion 13 is easily distorted. When distortion occurs in the coupler portion 13, polarization state of the light passing through the coupler portion 13 is likely to vary.

A viscosity of the adhesive 3 before curing is, for example, 5000 to 15000 mPa·s. When the viscosity is less than 5000 mPa·s, the adhesive 3 spreads too much into the groove 2a due to capillary action, and an area of the adhesive 3 adhering to the coupler portion 13 is too large. On the other hand, when the viscosity is more than 15000 mPa·s, the adhesive 3 is too hard and it is difficult to apply the adhesive 3 to the coupler portion 13 in the groove 2a.

Portions near both ends of the coupler portion 13, in other words, the portions where the coupler section 13 branches into the first optical fiber 11 and the second optical fiber 12 are disposed at both end portions of the groove 2a. As described above, the adhesives 3 are respectively provided at both end portions of the groove 2a. The adhesive 3 fixes the covering portions 11c and 12c of the first optical fiber 11 and the second optical fiber 12 and glass portions of the first optical fiber 11 and the second optical fiber 12 from which the covering portions 11c and 12c are removed (portions near both ends of the coupler portion 13 of the claddings 11b, 12b and the cores 11a, 12a and where the first optical fiber 11 and the second optical fiber 12 are not thinned) to the groove 2a.

The coupler portion 13 and the substrate 2 are housed in a protective cylinder 5 made of a metal member, and are fixed to the protective cylinder 5 with an adhesive. As a material of the protective cylinder 5, SUS, Invar, Kovar, or the like can be used. SUS is used in the example. Both end portions of the protective cylinder 5 are sealed with a sealing portion 6. The sealing portion 6 contains, for example, a silicone resin material. The first optical fiber 11 and the second optical fiber 12 penetrate the sealing portion 6 and protrude outwardly.

Figure 4:
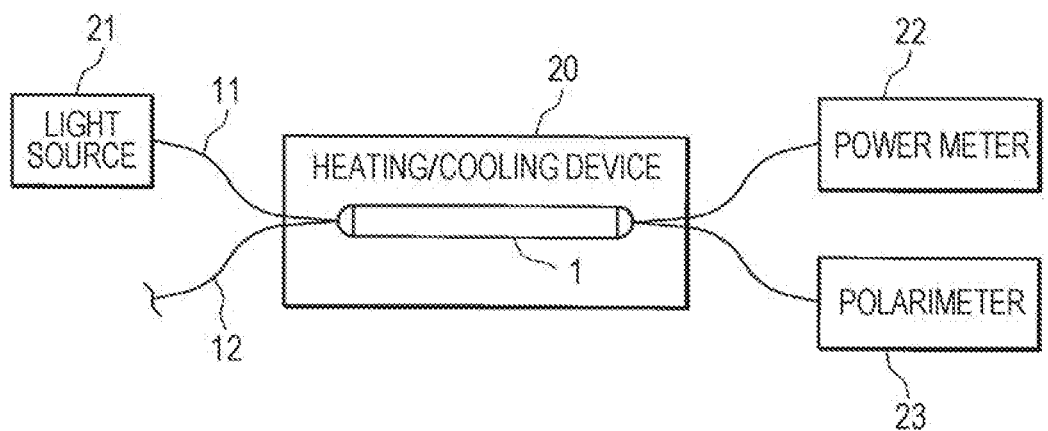
FIG. 4 is a block diagram schematically showing a configuration for measuring temperature dependence of polarization state.

By setting the Shore D hardness of the cured adhesive 3 to 35 or less, it is possible to suppress variation of the polarization state of the light passing through the coupler portion 13 with respect to temperature change. FIG. 4 is a block diagram schematically showing a configuration for measuring temperature dependence of the polarization state.

The optical fiber coupler 1 is provided in a heating/cooling device 20. The heating/cooling device 20 includes a Peltier element. A light source 21 is attached to one end portion of the first optical fiber 11, and a power meter 22 is attached to the other end portion. The power meter 22 measures the amount of light that has passed through the coupler portion 13 in the first optical fiber 11. The power meter 22 can measure insertion loss of the light with respect to temperature change.

Nothing is attached to one end portion of the second optical fiber 12, and a polarimeter 23 is attached to the other end portion. As the polarimeter 23, a free space polarimeter "PAX5710 series" manufactured by Thorlabs, Inc. can be used. In the example, "PAN5710IR-T" has been used. The polarimeter 23 can measure the variation of the polarization state of the light that has passed through the coupler portion 13 with respect to temperature change.

Figure 5:
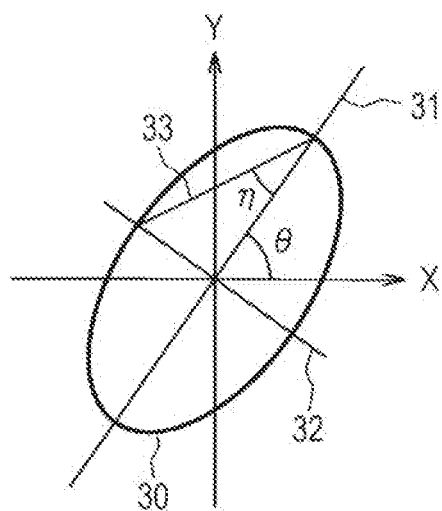
FIG. 5 is a diagram schematically showing a locus of an electric field vector projected on an XY plane when elliptically polarized light travels in Z direction.

FIG. 5 is a diagram schematically showing a locus of an electric field vector projected on an XY plane when elliptically polarized light travels in Z direction. In FIG. 5, X-axis and Y-axis are perpendicular to each other. Z-axis is perpendicular to the X-axis and the Y-axis and extends in a direction perpendicular to a paper surface. The light that has passed through the coupler portion 13 travels with elliptical polarization. When the light travels in the Z-axis direction, the locus of the electric field vector projected on the XY plane is an ellipse 30 as shown in FIG. 5. Note that an angle formed by a major axis 31 of the ellipse 30 and the X-axis, that is, an azimuth angle is defined as θ. An angle between a line segment 33 connecting an intersection of the ellipse 30 and the major axis 31 and an intersection of the ellipse 30 and a minor axis 32, and the major axis 31, that is, an ellipticity angle is defined as η.

Figure 6:
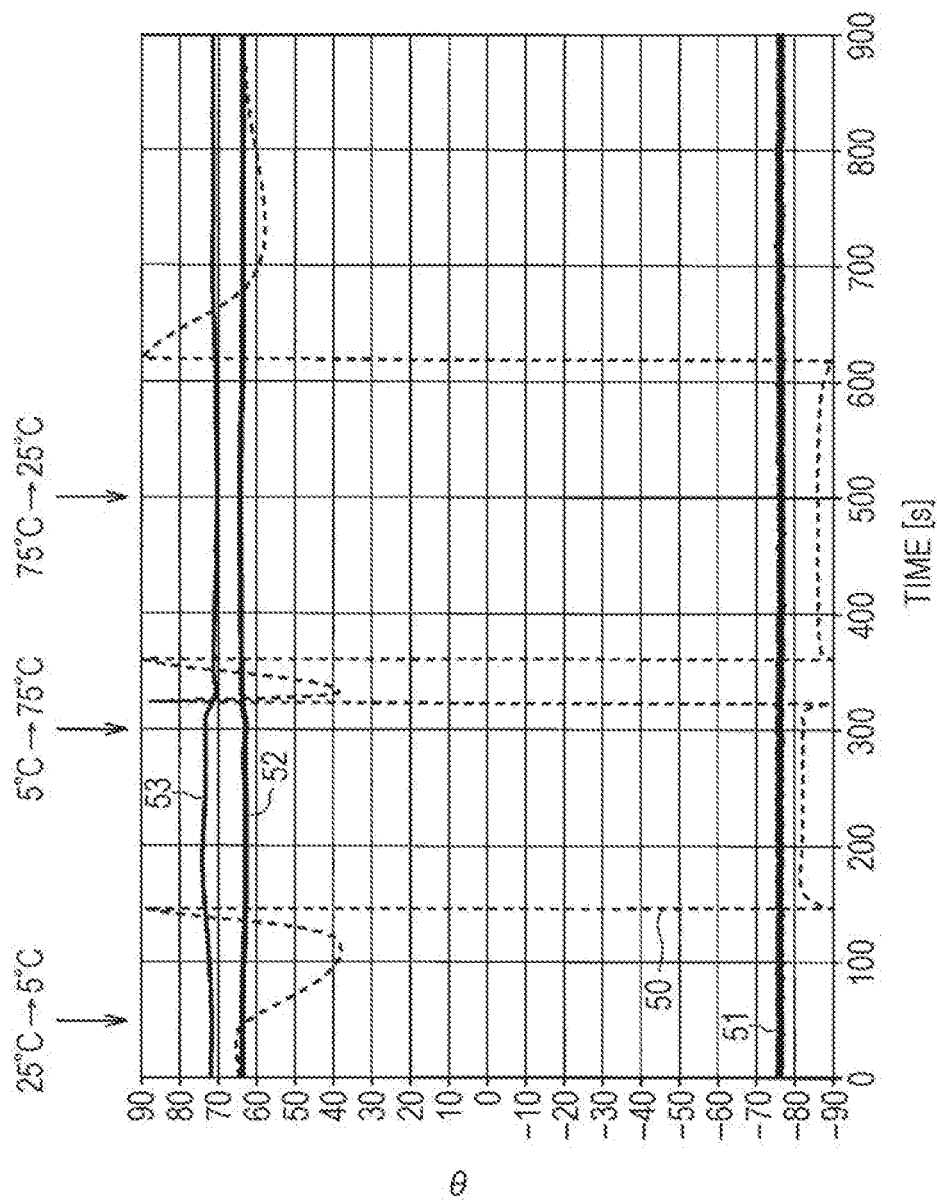
FIG. 6 is a graph showing an azimuth angle θ measured over time by a polarimeter.

FIG. 6 is a graph showing the azimuth angle θ measured over time by the polarimeter 23. FIG. 7 is a graph showing the ellipticity angle η measured over time by the polarimeter 23. In FIGS. 6 and 7, a trace 50 shows a measurement result for the optical fiber coupler 1 using the adhesive 3 having a Shore D hardness of 90. A trace 51 shows a measurement result for the optical fiber coupler 1 using the adhesive 3 having a Shore D hardness of 20. Traces 52 and 53 show measurement results for the optical fiber coupler 1 using the adhesive 3 having a Shore D hardness of 32.

A temperature at start of measurement is 25° C. When 25 seconds have elapsed after the start of measurement, the temperature of the heating/cooling device 20 is changed to 5° C., when 300 seconds have elapsed, the temperature of the heating/cooling device 20 is changed to 75° C., and when 500 seconds have elapsed, the temperature of the heating/cooling device 20 is changed to 25° C.

As shown by the trace 50 of FIGS. 6 and 7, when the adhesive 3 having a Shore D hardness of 90 is used, the azimuth angle θ and the ellipticity angle η vary greatly after the temperature change. On the other hand, as shown by traces 51 to 53, when the adhesive 3 having a Shore D hardness of 20 or 32 is used, the azimuth angle θ and the ellipticity angle η hardly vary even after the temperature change.

Variation ranges of the azimuth angle θ and the ellipticity angle η in the traces 51 to 53 will be described. FIG. 8 is a graph showing a variation value Δθ of the azimuth angle θ with reference to a value at the start of measurement. As shown by the trace 51 of FIG. 8, when the adhesive 3 having a Shore D hardness of 20 is used, the variation value Δθ is in a range of −1 to +1 degree. As shown by the traces 52 and 53 of FIG. 8, the variation value Δθ is in the range of −2 to +3 degrees.

FIG. 9 is a graph showing a variation value Δη of the ellipticity angle η with reference to the value at the start of measurement. As shown by the trace 51 of FIG. 9, when the adhesive 3 having a Shore D hardness of 20 is used, the variation value Δη is within the range of −4 to 2 degrees. As shown by the traces 52 and 53 of FIG. 9, the variation value Δη is within the range of −4 to +4 degrees.

As described above, when the adhesive 3 having a Shore D hardness of 35 or less is used, the azimuth angle θ and the ellipticity angle η hardly vary. That is, it is possible to suppress the variation of the polarization state with respect to temperature change in the light passing through the coupler portion 13.

Moreover, by setting the viscosity of the adhesive 3 to 5000 to 15000 mPa·s, it is possible to prevent the adhesive 3 from adhering to unnecessary portions of the coupler portion 13. Further, the adhesive 3 can be smoothly applied to the coupler portion 13 in the groove 2a. Therefore, manufacturing operation of the optical fiber coupler 1 can be performed smoothly.

Further, as characteristics of the optical fiber coupler 1, absolute values of the variation ranges of the azimuth angle θ and the ellipticity angle η are desirably 10 degrees or less, and more desirably 5 degrees or less. As described above, the absolute value of the variation range of the azimuth angle θ is 3 degrees or less and the absolute value of the variation range of the ellipticity angle η is 4 degrees or less.

The optical fiber coupler 1 can be used in an optical interferometer that requires stability of polarization characteristics. The optical fiber coupler 1 is used, for example, in an apparatus using OCT (Optical Coherence Tomography). In general, the apparatus is provided with a polarization controller. When the apparatus is used, degree of polarization is adjusted by operating the polarization controller depending on the temperature of an environment where the apparatus is installed. When the polarization controller is driven manually, user operation is required. However, a user may forget the operation. Typically, when the user has not operated the polarization controller and has not adjusted the degree of polarization despite the fact that the temperature has changed significantly, the polarization state of the optical fiber coupler 1 has changed, and thus there has been a problem in using the apparatus.

In the optical fiber coupler 1 according to the embodiment, the absolute values of the variation ranges of the azimuth angle θ and the ellipticity angle η with respect to temperature change are 10 degrees or less. Therefore, once the polarization is adjusted, it is not necessary to perform readjustment due to the change in polarization by the temperature change, so that convenience for the user can be improved.

Even when the temperature is changed in a range of 5 to 75° C., the absolute values of the variation ranges of the azimuth angle θ and the ellipticity angle η are 10 degrees or less. That is, the variation of the polarization state can be suppressed at the environmental temperature assumed to be normally used.

As the optical fiber used in the present invention, an optical fiber that transmits the light having a wavelength band of 440 to 2200 nm in a single mode is selected, and the optical fiber having a cladding diameter of 125 μm and a coating diameter of 250 μm is generally selected. In the embodiment, Corning HI780 has been used as an example of the optical fiber.

It should be considered that the embodiment disclosed here is illustrative and is not restrictive in all respects. Technical features described in examples can be combined with each other. The scope of the present invention is intended to include all modifications within the scope of claims, and the scope equivalent to the scope of claims.

LIST OF REFERENCE NUMERALS

1 Optical fiber coupler
2 Substrate
2a Groove
3 Adhesive
11 First optical fiber
12 Second optical fiber
13 Coupler portion

The invention claimed is:
1. An optical fiber coupler comprising:
a substrate having a groove;
a coupler portion which is inserted into the groove and to which a middle portion of each of optical fibers is melt, stretched and joined; and
an adhesive provided within the groove, wherein
each of the optical fibers includes a glass portion and a covering portion which covers the glass portion,
the coupler portion is formed by joining the glass portion of each of the optical fibers from which the covering portion is removed,
the coupler portion has opposed ends which are fixed to the groove by the adhesive,
the covering portion of each of the optical fibers is partly inserted in the groove,
the adhesive covers the glass portion and the covering portion entirely in a circumferential direction within the groove,
Shore D hardness of the adhesive is 10 to 35,
each of the optical fibers is a single mode optical fiber,
the adhesive includes an acrylate resin material, and
when an azimuth angle of light that has passed through the coupler portion is measured over time, an absolute value of variation range of the azimuth angle with respect to temperature change of 5 to 75° C. is 10 degrees or less.

2. The optical fiber coupler according to claim 1, wherein a viscosity of the adhesive is 5000 to 15000 mPa·s.

3. The optical fiber coupler according to claim 1, wherein the single mode optical fiber does not include a stress applying part in the glass portion.

4. An optical fiber coupler comprising:
a substrate having a groove;
a coupler portion which is inserted into the groove and to which a middle portion of each of optical fibers is joined;
an adhesive for bonding the coupler portion to the substrate; and
a protective cylinder having opposed ends and housing the substrate and the coupler portion therein, each of ends of the protective cylinder being sealed with a sealing portion, wherein
each of the optical fibers includes a glass portion and a covering portion which covers the glass portion,
the covering portion of each of the optical fibers is partly inserted in the groove,
the adhesive covers the glass portion and the covering portion entirely in a circumferential direction within the groove,
Shore D hardness of the adhesive is 10 to 35,
the adhesive includes an acrylate resin material, and
when an azimuth angle of light that has passed through the coupler portion is measured over time, an absolute value of variation range of the azimuth angle with respect to temperature change of 5 to 75° C. is 10 degrees or less.

5. The optical fiber coupler according to claim 4, wherein each of the optical fibers is a single mode optical fiber.

6. The optical fiber coupler according to claim 4, wherein a viscosity of the adhesive is 5000 to 15000 mPa·s.

7. An optical fiber coupler comprising:
a substrate having a groove;
a coupler portion which is inserted into the groove and to which a middle portion of each of optical fibers is joined; and
an adhesive for bonding the coupler portion to the substrate, wherein
Shore D hardness of the adhesive is 10 to 35, each of the optical fibers includes a glass portion and a covering portion which covers the glass portion, the covering portion of each of the optical fibers is partly inserted in the groove, the adhesive covers the glass portion and the covering portion entirely in a circumferential direction within the groove, the adhesive includes an acrylate resin material, and when an azimuth angle of light that has passed through the coupler portion is measured over time, an absolute value of variation range of the azimuth angle with respect to temperature change of 5 to 75° C. is 10 degrees or less.

8. The optical fiber coupler according to claim 7, wherein each of the optical fibers is a single mode optical fiber.

9. The optical fiber coupler according to claim 7, wherein a viscosity of the adhesive is 5000 to 15000 mPa·s.

* * * * *